No. 789,791. PATENTED MAY 16, 1905.
H. A. BOEDECKER, Jr.
REVERSING VALVE.
APPLICATION FILED DEC. 29, 1902.
3 SHEETS—SHEET 1.
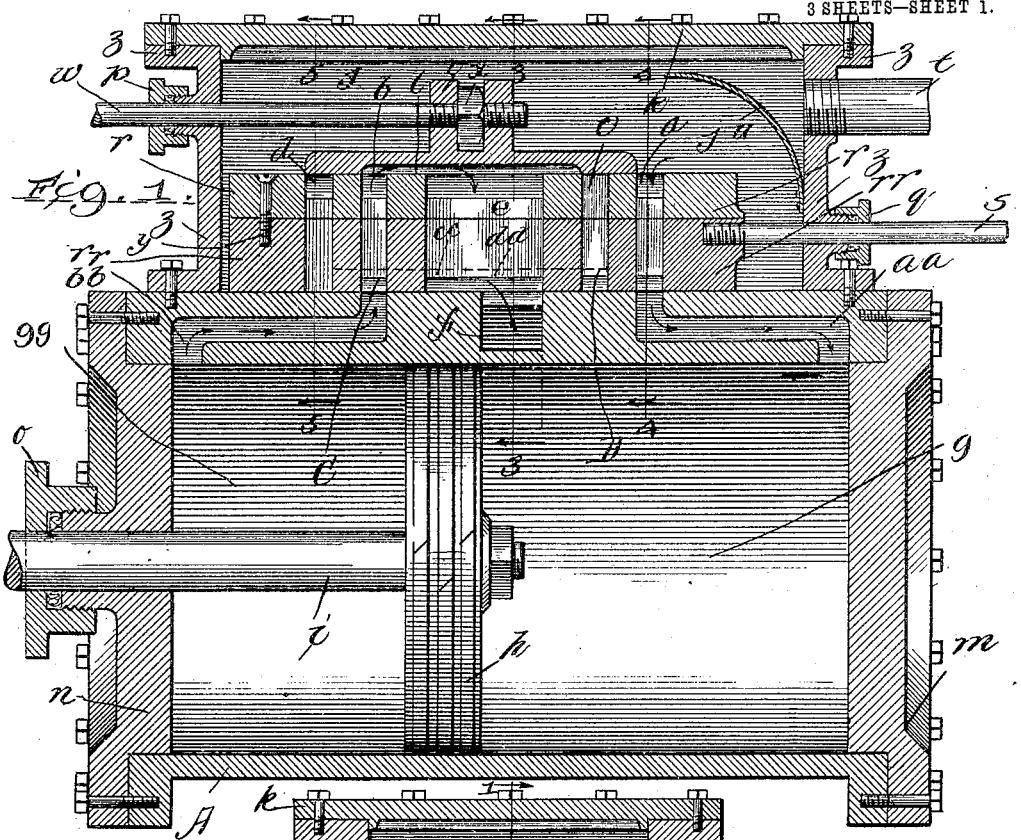
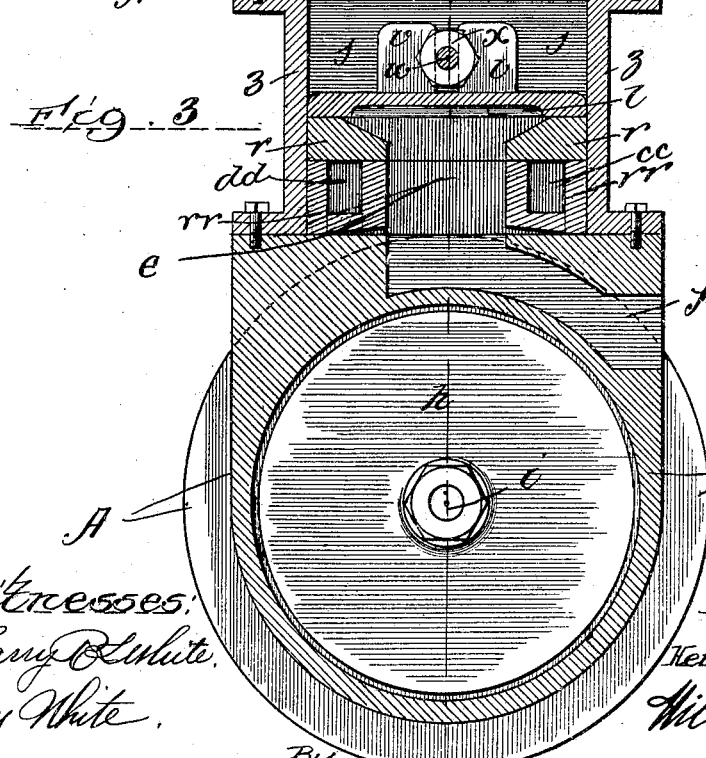
Witnesses:
Harry B. White
Ray White
Inventor:
Henry A. Boedecker Jr.
By Will Boedecker
Attorney.

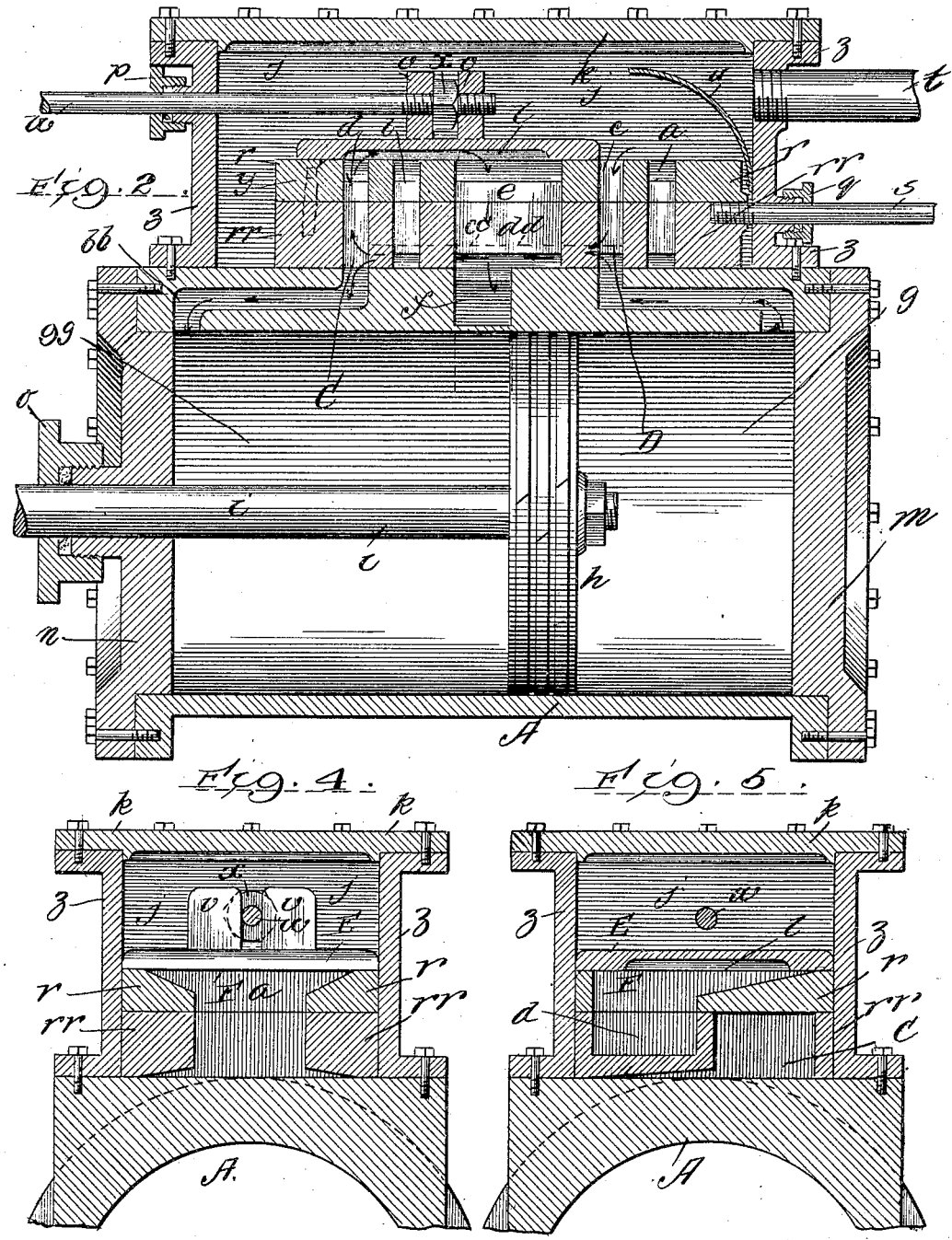

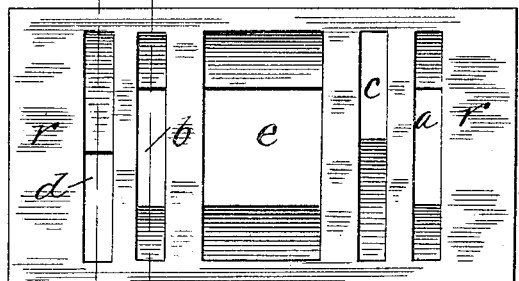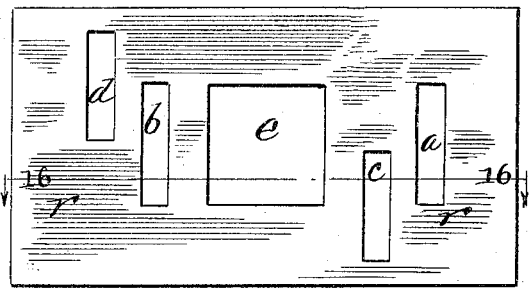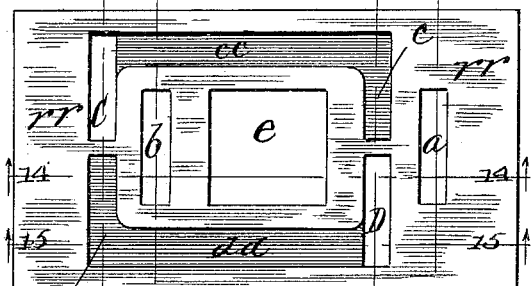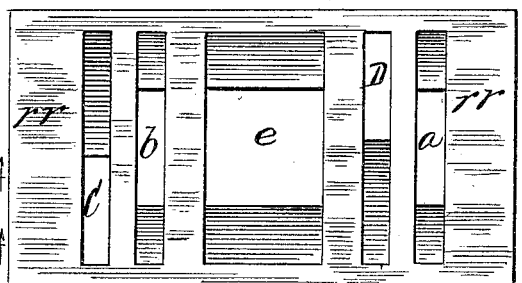

No. 789,791. Patented May 16, 1905.

UNITED STATES PATENT OFFICE.

HENRY A. BOEDECKER, JR., OF TIEDTVILLE, ILLINOIS.

REVERSING-VALVE.

SPECIFICATION forming part of Letters Patent No. 789,791, dated May 16, 1905.

Application filed December 29, 1902. Serial No. 136,999.

*To all whom it may concern:*

Be it known that I, HENRY A. BOEDECKER, Jr., a citizen of the United States, residing at Tiedtville, in the county of Cook and State of Illinois, have invented a new and useful Improvement in Reversing-Valves, of which the following is a full, clear, and exact description.

My invention relates to an improved reversing-valve for steam-engines, and has special reference to its adaptation to the class of engines known to the trade as "automobile-engines;" but it is not limited thereto, as it may be applied to any slide-valve engine adapted for reverse motion.

My improvement will be readily understood from the following description, taken in connection with the accompanying drawings, which form part of my specification.

Figure 1 is a longitudinal section of an engine-cylinder and the steam-chest, showing therein the reversing-valve in position to the left for running the engine in its forward motion. Fig. 2 is a similar view showing the position of the reversing-valve to the right for running the engine in its backward motion. Figs. 3, 4, and 5 are vertical transverse sections of the cylinder, steam-chest, slide D-valve, and my reversing-valve, but showing the parts of the reversing-valve in different positions. Figs. 6 and 7 comprise the upper half of the reversing-valve. Figs. 8 and 9 comprise the lower half of the reversing-valve. Fig. 10 is a sectional view on line 10 10 of Fig. 8. Fig. 11 is a sectional view on line 11 11 of Fig. 8. Fig. 12 is a sectional view on line 12 12 of Fig. 8. Fig. 13 is a sectional view on line 13 13 of Fig. 8. Fig. 14 is a sectional view on line 14 14 of Fig. 8. Fig. 15 is a sectional view on line 15 15 of Fig. 8. Fig. 16 is a sectional view on line 16 16 of Fig. 7. Fig. 17 is a sectional view on line 17 17 of Fig. 6. Fig. 18 is a sectional view on line 18 18 of Fig. 6. Fig. 19 is a sectional view on line 19 19 of Fig. 20, slide-valve. Fig. 20 is a plan view of slide-valve; Fig. 21, underneath plan view of slide-valve; Fig. 22, side elevation of same.

Reference being had to the drawings, in which similar letters refer to similar parts, A represents an engine-cylinder provided with the usual steam-ports $aa$ and $bb$ and exhaust-port $f$.

Letter $h$ represents the piston.

Letter $z$ represents the steam-chest, having arranged therein the reversing-valve and a slide D-valve.

Letters $r$ and $rr$ represent the reversing-valve, which is provided with steam-ports $a$, $b$, $c$, and $d$ and exhaust-port $e$, to which is attached a rod $s$, used to reverse the engine. This moves between the seats formed on the cylinder and the under side of the seat F, of ordinary construction, known as the "D-valve," which is clearly shown in Figs. 1 and 2, provided with valve-rod $w$, connected to an eccentric on the engine-shaft.

From the foregoing description, reference being had to the drawings, the skilled mechanic will readily understand the construction of my improvement without further description as to the construction.

Fig. 1 is a sectional view of 1 1 of Fig. 3, which shows the engine to be working in the forward motion. It will be observed that the live steam enters steam-pipe $t$ on steam-chest $z$, in which is attached a plate $u$, which acts as a distributer of the steam when it comes into the steam-chest. Thereupon it enters steam-port $a$ of the reversing-valve $r\ rr$, then through ports $aa$ of the cylinder into cylinder $g$. The dead steam that has done its work in cylinder $gg$ will then exhaust through steam-port $bb$ of the cylinder, then through steam-port $b$ of the reversing-valve $r\ rr$, then through the hollow space $l$ under the D slide-valve $v$ out into the exhaust-port $e$ of the reversing-valve $r\ rr$, and finally through the exhaust-port $f$ of the cylinder, and vice versa, as in Fig. 2. When the engineer desires to reverse the motion of the engine, he moves a lever which is attached to the stem $s$ to the right, thereby moving the reversing-valve, which is shown in Figs. 1 and 2.

Fig. 2 is a sectional view of the reversing-valve in the backward motion. To reverse the engine, move the reversing-valve $r\ rr$ to the right by means of a rod $s$, which is attached to said valve, so that the steam-ports C and D, as shown in Fig. 8, of the reversing-valve *rr*, correspond with the steam-ports *aa* and *bb* of the cylinder. It will be observed that the steam enters at steam-port *c* of the reversing-valve *r rr* and travels through canal *cc* and then through steam-port C, as shown in Fig. 8, then through steam-port *bb* of the cylinder into cylinder *gg*. The steam that has done its work in cylinder *g* will pass through steam-port *aa* of the cylinder into steam-port D, through canal *dd* and up through steam-port *d*, as shown in Fig. 6, and will then exhaust through the hollow space *l* under the slide D-valve *v*, out through exhaust-port *e* of said reversing-valve *r rr* through exhaust-port *f* of the cylinder.

Fig. 3 is a sectional view on line 3 3 of Fig. 1, showing the valve in position to let exhaust-steam pass from exhaust-port *e* of the reversing-valve through exhaust-port *f* of the steam-chest. *cc* and *dd* are steam-ports of said valve for backward motion.

Fig. 4 is a sectional view on line 4 4 of Fig. 1, showing the valve in position for forward motion. *a* is steam-port for said motion.

Fig. 5 is a sectional view on line 5 5 of Fig. 1, showing the valve in position for backward motion. C and *d* are steam-ports of said valve for the backward motion.

Figs. 6 and 7 comprise the upper half of the reversing-valve. Fig. 6 represents the top view of the upper half. Fig. 7 represents the bottom view of same. *a* and *b* are steam-ports for forward motion. *c* and *d* are steam-ports for backward motion, and *e* exhaust-port.

Figs. 8 and 9 comprise the lower half of the reversing-valve. Fig. 8 represents the inside view of the lower half, and Fig. 9 represents the bottom of same. *a* and *b* are steam-ports for forward motion. *c cc* C and *d dd* D are steam-ports for backward motion. *e* is the exhaust-port.

Similar letters refer to similar parts throughout the remaining views from Fig. 10 to Fig. 22.

Having thus fully described my invention, what I claim, and desire to secure by Letters Patent of the United States, is—

1. The combination of a reversing-valve, consisting of two parts, having one exhaust-port and two steam-ports cut through the upper and lower parts, and two channels in the lower part, and two steam-ports cut through the upper part which acts in coincidence with two channels in the lower part of said valve substantially as set forth.

2. The combination of a reversing-valve, consisting of two parts having one exhaust-port with chamfered grooves on both sides on top of the upper part and chamfered grooves on both sides on bottom of the lower part, and two steam-ports with chamfered grooves on both sides on top of the upper part and chamfered grooves on both sides of two steam-ports on bottom of the lower part, and having two steam-ports with a chamfered groove on one side on top of the upper part which acts in coincidence with the channels in the lower part and a chamfered groove on one side of two steam-ports on bottom of the lower part which acts in coincidence with the steam-ports on the cylinder, substantially set forth.

In testimony whereof I have signed my name to this specification in the presence of the two subscribing witnesses.

HENRY A. BOEDECKER, Jr.

Witnesses:
J. A. JACKSON,
J. W. KNOX, Jr.